United States Patent
Schledjewski et al.

(10) Patent No.: US 6,455,618 B2
(45) Date of Patent: Sep. 24, 2002

(54) THERMOPLASTIC ELASTOMER MOLDING COMPOSITIONS WITH IMPROVED PROCESSABILITY

(75) Inventors: Ralf Schledjewski, Kaiserslautern (DE); Hans-Werner Funk, Bomlitz (DE); Dirk Schultze, Düsseldorf (DE); Rainer Brandt, Walsrode (DE)

(73) Assignee: Wolff Walsrode AG, Walsrode (DE)

( * ) Notice: Subject to any disclaimer, the term of this patent is extended or adjusted under 35 U.S.C. 154(b) by 0 days.

(21) Appl. No.: 09/876,344

(22) Filed: Jun. 7, 2001

(30) Foreign Application Priority Data

Jun. 13, 2000 (DE) .......................... 100 29 076

(51) Int. Cl.$^7$ .............................. C08J 3/00; C08K 3/20; C08K 5/20; C08K 5/36; C08L 75/00
(52) U.S. Cl. ..................... 524/191; 264/563; 264/573; 264/177.14; 264/331.1; 264/331.13; 264/331.16; 264/331.18; 264/331.19; 264/331.21; 524/277; 524/492; 524/493; 524/590
(58) Field of Search ................................ 524/219, 277, 524/590, 492, 493; 264/563, 573, 177.14, 331.11, 331.13, 331.16, 331.18, 331.19, 331.21

(56) References Cited

U.S. PATENT DOCUMENTS 5,068,138 A   *  11/1991   Mitchell et al.
5,925,697 A   *   7/1999   Brauer et al.

* cited by examiner

*Primary Examiner*—Patrick D. Neiland
(74) *Attorney, Agent, or Firm*—Joseph C. Gil; James R. Franks

(57) ABSTRACT

Described is a thermoplastic molding composition comprising: a) 0.05 to 1.5 wt. %, with respect to the entire molding composition, of a fatty acid amide ester wax; b) 0.5 to 10 wt. %, with respect to the entire molding composition, of a silica selected from natural silica, synthetic silica and mixtures thereof; c) 0 to 1 wt. %, with respect to the entire molding composition, of a montan wax; and d) at least one thermoplastic elastomer. Also described are a method of preparing the thermoplastic molding composition, and methods of preparing articles from the thermoplastic molding composition.

9 Claims, No Drawings

THERMOPLASTIC ELASTOMER MOLDING COMPOSITIONS WITH IMPROVED PROCESSABILITY

FIELD OF THE INVENTION

The present invention relates to mixtures of thermoplastic elastomers, readily soluble waxes and inorganic antiblocking agents (i.e., molding compositions), which have improved ease of passage through machines during extrusion processing.

BACKGROUND OF THE INVENTION

The ease of passage through machines of thermoplastic materials during extrusion processing can be affected by the constructional design of the mould used to work up the material. Optimisation is generally possible only with regard to certain raw materials characteristics of the material being processed. When processing different materials on one extrusion device, this can provide optimised ease of passage through the machine only in exceptional cases.

Thermoplastic resins are typically processed, for example, in screw-type tools. A review of their structures is given, for example, in: Wortberg, Mehleke and Effen in: Kunststoffe, 84 (1994), S. 1131–1138, Pearson in: Mechanics of Polymer Processing, Elsevier Publishers, New York 1985, Fa. Davis-Standard in: Paper, Film & Foil Converter 64 (1990), S. 84–90. Moulds for extruding the melts, for example to give tubular semi-finished products, are described inter alia, by: Michaeli in: Extrusionswerkzeuge, Hanser Verlag, Munich 1991.

Thermoplastic elastomers are a group of materials where the essential characteristics are thermoplastic processability combined with elastomer materials behaviour. The main members of the group of thermoplastic elastomers (TPE) are block copolymers. These, apart from thermoplastic polyurethanes (TPE-U), include but are not limited to thermoplastic styrene-based systems (TPE-S), thermoplastic polyetheresters (TPE-E) and thermoplastic polyether block amides (TPE-A).

As a result of the thermoplastic processability, these materials can be extruded in an extrusion process and then further processed with the aid of a die to give, for example, a profiled section, a cable sheath or a tubular semi-finished product. Films based on TPE-E are described, for example, in U.S. Pat. No. 5,859,083. Those based on TPE-A are described in EP-A 0 761 715. TPE-S materials suitable for extrusion and their uses are described, for example, in DE-A 19 628 834. Semi-finished products made of TPE-U, processes for preparing them and their use are known from the prior art, for example, from EP-A 0 308 683, EP-A 0 526 858, EP-A 0 571 868 or EP-A 0 603 680. The preparation of TPE-U semi-finished products using substantially incompatible polymers as matting agents in the TPE-U is also described, for example, in DE-A-41 26 499. A review of the group of thermoplastic elastomers is given, for example, in: Thermoplastic elastomers: a comprehensive review, ed. N. R. Legge, G. Holden and H. E. Schroeder, Carl Hanser Verlag, Munich, 1987 and Thermoplastische Elastomere— Herausforderung an die Elastomerverarbeiter, eds.: VDI-Gesellschaft Kunststofftechnik, VDI Verlag, Düsseldorf, 1997.

Auxiliary substances and additives may be used during the thermoplastic processing of TPE's. The following may be mentioned by way of example here: waxes which act as friction-reducing internal and external lubricants. In addition, waxes take on the task of a separating agent in order to prevent sticking of the material to the surrounding material (e.g. the die). They are also used as dispersants for other additives, e.g. pigments or colorants.

Waxes used in the plastics processing sector include, for example, fatty acid amides, e.g. stearyl amides and oleic acid amides, fatty acid esters, e.g. montanates and stearates, and also polyethylene waxes. A detailed review of this topic is available: Taschenbuch der Kunststoff-Additive, eds. R. G ächter, H. Müller, Hanser Verlag, Munich, Vienna, 1979, p. 229 et seq.

The specific processing and application temperatures of various thermoplastic materials and their different chemical reactivities typically leads to a situation in which not all waxes can be used in the same way. Substantially amide waxes, for example, are used for TPE-U. These exhibit a high tendency to migrate, which provides a very good separating effect. On the other hand, the lubricating effect of these waxes is expressed only weakly. Montanate waxes, for example, exhibit good lubricating properties in TPE-U (EP-A 0 308 683; EP-A 0 670 339). However, in this case the separating effect is inadequate, even at high concentrations. A reduction in internal and external friction during melt processing can also be produced with a TPE-U, for example, by the use of 0.2 to 5 wt. % of at least one polyolefin or polystyrene (U.S. Pat. No. 3,358,052).

The use of antiblocking agents as an additive is important when preparing flat semi-finished products. As a result of using these, for example, a surface topography is typically produced, which prevents the sticking together of flat plastics items during further processing, less so during meltprocessing moulding (e.g. film preparation). Natural or synthetic silicas are used here for example. Additives consisting of incompatible materials such as e.g. polyolefins or also polystyrene are also known for use in TPE-U (DE-A-41 26 499).

SUMMARY OF THE INVENTION

There is the objective of improving ease of passage through machines during the extrusion processing of thermoplastic elastomers, no matter what the structural design of the extrusion device.

In accordance with the present invention, there is provided a thermoplastic molding composition comprising:

a) 0.05 to 1.5 wt. %, with respect to the entire molding composition, of a fatty acid amide ester wax;

b) 0.5 to 10 wt. %, with respect to the entire molding composition, of a silica selected from natural silica, synthetic silica and mixtures thereof;

c) 0 to 1 wt. %, with respect to the entire molding composition, of a montan wax; and d) at least one thermoplastic elastomer.

Other than in the operating examples, or where otherwise indicated, all numbers expressing quantities of ingredients, reaction conditions, etc. used in the specification and claims are to be under stood as modified in all instance by the term "about."

DETAILED DESCRIPTION OF THE INVENTION

Surprisingly, the ease of passage through machines during the extrusion processing of a thermoplastic elastomer is clearly improved by the molding composition according to the invention. While not intending to be bound by any theory, it is believed based on the evidence at hand that this is due to improved flow characteristics of the melt coupled with a simultaneously increased mass throughput due to the reduced energy consumption of the extrusion device.

Fatty acid amide waxes which can be used according to the present invention include but are not limited to, for example, erucic amide ethyl erucate, oleic amide ethyl stearate, stearic amide butyl stearate, stearic amide ethyl oleate, cerotic amide ethyl cerotate.

"The molding composition of the present invention comprises a silica selected from natural silica, synthetic silica and mixtures thereof.

The molding composition of the present invention may optionally further comprise a montan wax as an additional component. The proportion of the montan wax, according to the invention, is typically between 0 and 1 wt. %, based on the weight of the molding composition. In a particularly preferred embodiment of the present invention, a portion of the montanic acid of the montan wax is esterified with butylene glycol, and the remainder of the montanic acid of the montan wax is saponified with calcium hydroxide. "The montan wax may contain, based on the total weight of the montan wax, from 0.1 % wt. to 1 % wt. of montan wax esterified with butylene glycol, and from 0.1 % wt. to 1 % wt. of montanic acid saponified with calcium hydroxide."

According to the invention, the molding composition contains at least one thermoplastic elastomer. In a preferred embodiment of the present invention, the thermoplastic elastomer is a block copolymer such as, for example, copolyetheresters or polyether block amides.

In a particularly preferred embodiment, at least one thermoplastic polyurethane is used as the thermoplastic elastomer. Preferably, a substantially linear thermoplastic polyurethane elastomer, in which the longer-chain diol component is a polyester or polyether and which has a Shore hardness of preferably 70 to 95 A, particularly preferably 85 to 95 A, determined according to DIN 53505, is used.

Suitable thermoplastic polyether-diol based polyurethane or polyester-diol based polyurethane elastomers and/or mixtures thereof may be prepared, for example, by art-recognised batch and/or partly or fully continuous processes. An example of such an art-recognised process involves the reaction in a screw-extruder of:

(a) organic, preferably aromatic or cycloaliphatic diisocyanates;

(b) polymer diols with molecular weights of preferably 500 to 8000 Mw (c) chain-lengthening components with molecular weights of preferably 60 to 400 Mw (d) optionally in the presence of catalysts; and (e) optionally in the presence of auxiliary substances and/or additives.

The following details relate to components (a) through (e) which can be used in the above described process for preparing thermoplastic polyether-diol based polyurethane or polyester-diol based polyurethane elastomers.

Suitable organic diisocyanates (a) are preferably aromatic or cycloaliphatic diisocyanates. The following may be mentioned in detail: aromatic diisocyanates such as 2,4- and 2,6-toluylene diisocyanate, 4,4'-, 2,4'- and 2,2'-diphenylmethane diisocyanate or mixtures thereof; cycloaliphatic diisocyanates, such as isophorone diisocyanate, 1,4-cyclohexane diisocyanate and 4,4'-, 2,4'- and 2,2'-dicyclohexylmethane diisocyanate or mixtures thereof.

Suitable higher molecular weight diol compounds (b) with preferred molecular weights of 400 to 8000 Mw are preferably molecules with a linear structure and a low glass transition or softening point. These include polyetherols and polyesterols. However, the following are also suitable: hydroxyl group-containing polymers, for example polyacetals such as polyoxymethylene and in particular water-insoluble formals and aliphatic polycarbonates, in particular those prepared by transesterification from diphenyl carbonate and hexanediol-1,6. Also suitable are hydroxyl group-capped diol compounds formed from polyolefins, in particular aliphatic hydroxyl group-capped copolymers of ethylene and butylene. The diol compounds are preferably at least substantially linear, i.e., having a structure which is to be difunctional in the context of the isocyanate reaction. The diol compounds mentioned may be used as individual components or in the form of mixtures.

Suitable chain-lengthening agents (c) with molecular weights of 60 to 400, preferably 60 to 300 $\mu$W are preferably alkanediols with 2 to 12 carbon atoms, preferably with 2, 4 or 6 carbon atoms, e.g., ethanediol, hexanediol-1,6 and in particular butanediol and dialkylene ether glycols, e.g., diethylene glycol and dipropylene glycol. Also suitable, however, are diesters of terephthalic acid with alkanediols with 2 to 4 carbon atoms, e.g., bis-ethanediol terephthalate or bis-butanediol-1,4 terephthalate, hydroxyalkylene ethers of hydroquinone, (cyclo)aliphatic diamines, e.g., isophorone diamine, ethylene diamine and aromatic diamines, e.g., 2,4- and 2,6-toluylene diamine.

Suitable catalysts (d) which accelerate in particular the reaction between isocyanate groups in category (a) and the hydroxyl groups in categories (b) and (c) are known to those of ordinary skill in the art and include: conventional tertiary amines, e.g., triethylamine, dimethylcyclo-hexyl amine, N-methylmorpholine, N,N'-dimethylpiperazine, 2-(dimethyl-amino-ethoxy)-ethanol, diazabicylo(2.2.2)-octane and the like; and in particular organic metal compounds such as titanates, iron compounds such as e.g. iron(III) acetylacetonate, tin compounds, e.g., tin diacetate, tin dioctoate, tin dilaurate or tin dialkyl salts of aliphatic carboxylic acids such as dibutyltin diacetate, dibutyltin dilaurate and the like. The catalysts are typically used in amounts of 0.001 to 0.2 parts per 100 parts of hydroxyl compound (b).

Apart from catalysts, the auxiliary substances and/or additives (e) may also be added to structural components (a) to (c). Examples of auxiliary substances (e) that may be used include, but are not limited to: lubricants, inhibitors, stabilisers against hydrolysis, light, heat, oxidation or discoloration, colorants, pigments, inorganic and/or organic fillers, reinforcing agents and low molecular weight plasticisers.

Commercially available thermoplastic polyurethanes that may be used in the molding compositions of the present invention include, but are not limited to, DESMOPAN thermoplastic polyurethane, ELASTOLLAN thermoplastic polyurethane, ESTANE thermoplastic polyurethane, MORTHANE thermoplastic polyurethane, PELLETHANE thermoplastic polyurethane, PEARLTHANE thermoplastic polyurethane, SKYTHANE thermoplastic polyurethane, TECOFLEX thermoplastic polyurethane and TEXIN thermoplastic polyurethane.

In an embodiment of the present invention, the molding composition may also contain art-recognised additives selected from the group comprising: (I) antiblocking agents, inorganic or organic spacer pieces; (II) lubricants or mould release agents; (III) pigments or fillers; and (IV) stabilisers. Additives (I) to (IV) may be present in the molding composition of the present invention in an amount of from 0 and 30 % by weight, based on the weight of the molding composition.

Art-recognised additives which may be included in molding compositions according to the present invention are described in further detail, for example, by Gächter and M üller in: Kunststoff-Additive, Carl Hanser Verlag Munich (1979).

"The molding composition of the present invention may be prepared by mixing in a suitable mixer, e.g., in a compounder. In an embodiment of the present invention, the thermoplastic molding composition is prepared by a method comprising, mixing a concentrate of the fatty acid amide ester wax a), the silica b) and the montan wax c) with the thermoplastic elastomer d).

Molding compositions according to the present invention improve the ease of passage through machines during extrusion processing (i.e., they have improved processability). In particular, products having a high ratio of surface area to cross-section may be prepared from the molding compositions of the present invention by means of shaping moulds, for example, by means of film extrusion.

"The present invention also provides a method of preparing a tubular semi-finished product or article, which method comprises extruding the thermoplastic molding composition of the present invention in an extrusion device having a downstream die. Extrusion devices that may be used include those known to the skilled artisan, e.g., single- and twin-screw co- or counter-rotating extruders. The downstream die serves to form the extruded thermoplastic molding composition into a tubular semi-finished article."

The surface properties of structural parts, e.g., extruded articles, prepared from molding compositions according to the invention can be modified on one or more surfaces using known physical and chemical methods of treatment, such as corona treatment.

The present invention is more particularly described in the following examples, which are intended to be illustrative only, since numerous modifications and variations therein will be apparent to those skilled in the art. Unless otherwise specified, all parts and percentages are by weight.

EXAMPLES

The molding compositions described in the context of the following examples were processed on a single-screw extruder with D=60 mm using a three-zone screw, L/D=25, with a combined shear and mixing section. The temperature in the extruder cylinder could be set at a constant value within each of 5 zones. The temperature profile in the extruder and also the adjustments on the downstream measuring die were kept constant.

The examples were determined using an ester-TPE-U with Shore-A hardness 86, measured according to DIN 53505, corresponding to a Shore-D hardness of 36 and a Melt Volume Rate (MVR) of 26 cm$^3$/10 min, measured according to DIN ISO 1133 at 200° C. and 10.0 kg.

Constituents that were further used in the molding compositions are summarised in the following Table 1.

TABLE 1

|  |  | Description | Commercial Designation |
|---|---|---|---|
| wax 1: | W1* | stearyl amide ethyl stearate | (Abril Paradigm Wax 77) |
| wax 2: | W2* | butyl montanate partly saponified with Ca | (Hoechstwachs OP) |

TABLE 1-continued

|  |  | Description | Commercial Designation |
|---|---|---|---|
| wax 3: | W3* | ethylene bis-stearylamide | (Hoechstwachs C) |
| antiblock 1: | A1* | natural silica | (Superfloss E) |

* Abbreviated designations used in the following Table 2.

The extruder was operated with a constant speed of rotation, 38 rpm. The power consumption of the extruder, the mass throughput and the uniformity of the extruded extrudate were measured, the results of which are summarised in the following Table 2.

TABLE 2

| Example | Additive | Proportion (wt. %)$^{(a)}$ | Power consumption (Amps) | Throughput (kg/h) | Uniformity of the extrudate |
|---|---|---|---|---|---|
| 1 | W1 | 0.7 | 42 | 60 | uniform |
|  | W2 | 0.1 |  |  |  |
|  | A1 | 3.5 |  |  |  |
| 2 | W1 | 0.8 | 45 | 55 | uniform |
|  | A1 | 3.5 |  |  |  |
| 3 | W1 | 0.7 | 45 | 50 | non-uniform |
|  | W2 | 0.1 |  |  |  |
| 4 | W1 | 0.4 | 48 | 54 | uniform |
|  | A1 | 3.5 |  |  |  |
| 5 | W3 | 0.7 | 54 | 50 | uniform |
|  | A1 | 4.0 |  |  |  |

$^{(a)}$Percent weight based on the weight of the molding composition.

Examples 1 and 2 demonstrate the outstanding ease of passage through the machine of the molding composition according to the present invention. The positive effect of the presence of silica on the uniformity of the extrudate is demonstrated in Example 3. The sensitivity with reference to the formulation of the molding composition is made clear in Example 4. A comparison of Examples 1, 2 and 4 with comparison Example 5 demonstrates the advantage which can be obtained by the molding composition according to the invention with regard to ease of passage through a machine. Comparison Example 5 requires not only by far the highest energy input, but also results in the lowest mass throughput, relative to Examples 1, 2 and 4.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:
1. A thermoplastic molding composition comprising:
   a) 0.05 to 1.5 wt. %, with respect to the entire molding composition, of a fatty acid amide ester wax;
   b) 0.5 to 10 wt. %, with respect to the entire molding composition, of a silica selected from natural silica, synthetic silica and mixtures thereof;
   c) 0 to 1 wt. %, with respect to the entire molding composition, of a montan wax; and
   d) at least one thermoplastic elastomer.
2. The composition of claim 1 wherein said composition contains a thermoplastic elastomer selected from the group consisting of thermoplastic polyurethanes, thermoplastic polystyrenes, thermoplastic polyetheresters, thermoplastic polyether block amides and mixtures thereof.

3. The composition of claim 1 wherein a portion of the montanic acid of said montan wax is esterified with butylene glycol, and the remainder of the montanic acid of said montan wax is saponified with calcium hydroxide.

4. The composition of claim 1 wherein the thermoplastic elastomer is a block copolymer.

5. The composition of claim 1 wherein the thermoplastic elastomer is a copolyetherester.

6. The composition of claim 1 wherein the thermoplastic elastomer is a polyether block amide.

7. The composition of claim 1 wherein the thermoplastic elastomer is a thermoplastic polyurethane elastomer.

8. A method of preparing the thermoplastic molding composition of claim 1 comprising, mixing a concentrate of said fatty acid amide ester wax a), said silica b) and said montan wax c) with said thermoplastic elastomer d).

9. A method of preparing a tubular semi-finished product comprising extruding the thermoplastic molding composition of claim 1 in an extrusion device having a downstream die.

* * * * *